(12) United States Patent
Hollender

(10) Patent No.: US 8,248,228 B2
(45) Date of Patent: Aug. 21, 2012

(54) METHOD AND DEVICE FOR OPTIMIZING THE ALARM CONFIGURATION

(75) Inventor: Martin Hollender, Heidelberg (DE)

(73) Assignee: ABB Technology AG, Zurich (CH)

( * ) Notice: Subject to any disclaimer, the term of this patent is extended or adjusted under 35 U.S.C. 154(b) by 568 days.

(21) Appl. No.: 12/488,156

(22) Filed: Jun. 19, 2009

(65) Prior Publication Data

US 2009/0278680 A1     Nov. 12, 2009

Related U.S. Application Data

(63) Continuation of application No. PCT/EP2007/010948, filed on Dec. 13, 2007.

(30) Foreign Application Priority Data

Dec. 21, 2006  (DE) .......... 10 2006 061 960
Feb. 27, 2007  (DE) .......... 10 2007 009 341

(51) Int. Cl.
  *G08B 29/00*  (2006.01)

(52) U.S. Cl. ........ 340/506; 340/511; 340/514; 340/516; 340/6.1

(58) Field of Classification Search .......... 340/506, 340/511, 514, 516, 517, 6.1
See application file for complete search history.

(56) References Cited

U.S. PATENT DOCUMENTS

| | | | |
|---|---|---|---|
| 5,400,246 A * | 3/1995 | Wilson et al. .......... 700/17 |
| 5,581,242 A | 12/1996 | Arita et al. |
| 5,832,411 A * | 11/1998 | Schatzmann et al. .......... 702/23 |
| 7,080,398 B1 * | 7/2006 | Wichelman et al. .......... 725/107 |
| 2008/0316015 A1 | 12/2008 | Naedele et al. |

FOREIGN PATENT DOCUMENTS

WO   WO 2006/000110 A1   1/2006

* cited by examiner

*Primary Examiner* — Daryl Pope
(74) *Attorney, Agent, or Firm* — Buchanan Ingersoll & Rooney PC

(57) ABSTRACT

The disclosure relates to a method and device suitable in which historical process measurement values are evaluated and used for the generation of alarm suppression rules. In connection with predetermined requirements, alarm configuration parameters are tested, evaluated and optimized. The historical process measurement values are further used to identify predictive alarms. Results obtained in generating the alarm suppression rules and/or evaluating the alarm configuration parameters are utilized for the configuration of optimized alarm configuration parameters and alarm suppression rules in control systems.

11 Claims, 4 Drawing Sheets

METHOD AND DEVICE FOR OPTIMIZING THE ALARM CONFIGURATION

RELATED APPLICATIONS

This application claims priority as a continuation application under 35 U.S.C. §120 to PCT/EP2007/010948, which was filed as an International Application On Dec. 13, 2007 designating the U.S., and which claims priority to German Application No. 10 2006 061 960.9, filed on Dec. 21, 2006, and German Application No. 10 2007 009 341.3, filed on Feb. 27, 2007. The entire contents of these applications are hereby incorporated by reference in their entireties.

FIELD

The present disclosure relates to a method and device for optimizing alarm configuration parameters for alarm systems.

BACKGROUND

Alarm systems are important devices in monitoring systems or control systems of a technical plant, such as power plants or production plants, for example, and are an important aid for assisting operating personnel in detecting plant or process states which may require immediate intervention. The method of operation of the alarm systems for determining and displaying plant or process states is determined by alarm parameters, for example, by defined limit values of process variables.

Analyses carried out following an occurrence of serious malfunctions have shown the importance of the quality of alarm systems or optimum alarm parameters. It has come to light in this case that both late reporting of faults which were already looming a relatively long time beforehand and an excessively large number of alarm signals may be problematic. A single process fault, such as blocked valve, for example, may result in many different subsequent alarms, for example "flow rate too low" or "filling level too low". It is not unusual for the same process fault to result in hundreds of alarms. However, only those alarms to which the plant operators are capable of actionably reacting should be reported to the plant operators. In addition, the total number of alarms reported should also remain limited in critical situations since a large number of reports can not only be annoying but dangerous as well since, on the one hand, the personnel's attention maybe diminished and, on the other hand, important reports may be overlooked and/or ignored.

The findings from such analyses have resulted both in guidelines and recommendations for alarm systems and in multifarious attempts by experts to suppress undesirable reports and optimize alarm parameters. For example, EEMUA 191 (The Electrical Equipment Manufacturers and Users Association guide, publication No. 191, 1999, ISBN 0 85931 076 0) mentions that it is also expedient to limit the reported alarms to a total number of ten alarms within ten minutes for critical situations in an attempt to prevent plant operators from being overtaxed by the multiplicity of alarms. To achieve such aims, causal relationships between alarms are analyzed and a distinction is made between causal alarms (root cause) and subsequent alarms. An alarm identified as a subsequent alarm can be suppressed by means of suitable mechanisms in the control system. U.S. Pat. No. 5,581,242 proposes, for example, the practice of working with tables which store conditions for suppressing the display of generated alarms. WO 2006000110 describes a method for suppressing redundant alarms, in which a filter is used to identify those alarms from previously generated alarms which are redundant and those which have not yet been classified. Only non-redundant alarms and alarms which have not yet been classified are displayed. In addition, alarm management tools are commercially available. Such tools can be used, for example, to calculate correlation coefficients between alarms and may be a basis for configuring alarm suppression rules. However, only binary data, such as alarm on or off, are used in this case and results have, overall, been unsatisfactory. Plant operators occasionally consider alarm systems to be so useless or disruptive that they prefer to ignore them.

SUMMARY

According to a first aspect of the present disclosure, an exemplary method is provided for automatically checking the effect of predefined alarm configuration parameters using a data processing device, which has access to the predefined alarm configuration parameters, to historical process measured values and to test and assessment criteria for alarm characteristic values. The exemplary method comprises evaluating the historical process measured values for a selected period of time in the past using suitable calculation methods with reference to the predefined alarm configuration parameters, to determine alarm characteristic values. In addition, the exemplary method comprises assessing the determined alarm characteristic values with reference to the test and assessment criteria for alarm characteristic values, and outputting the assessment of the alarm characteristic values.

According to a second aspect of the present disclosure, an exemplary method is provided for automatically optimizing alarm configuration parameters using a data processing device, which has access to predefined alarm configuration parameters, to historical process measured values and to test and assessment criteria for alarm characteristic values. The exemplary method comprises evaluating the historical process measured values for a selected period of time in the past using suitable calculation methods with reference to the predefined alarm configuration parameters, to determine alarm characteristic values. In addition, the exemplary method comprises assessing the determined alarm characteristic values with reference to the test and assessment criteria for alarm characteristic values. Furthermore, the exemplary method comprises outputting the predefined alarm configuration parameters as optimized alarm configuration parameters if the alarm characteristic values meet requirements according to the test and assessment criteria for alarm characteristic values. The exemplary method also comprises calculating new alarm configuration parameters using optimization algorithms, and carrying out the evaluating, assessing and outputting steps again, if the determined alarm characteristic values do not meet the requirements for alarm characteristic values, the new alarm configuration parameters being used as predefined alarm configuration parameters.

According to a third aspect of the present disclosure, an exemplary method is provided for automatically generating alarm suppression rules using a data processing device, which has access to historical process measured values and alarms and to predefined threshold values for dependences between process measured values and/or alarms. The exemplary method comprises evaluating the historical process measured values and alarms for a selected period of time in the past using suitable calculation methods, and identifying process measured values and/or alarms which are causally linked to one another are identified; determining characteristic values for dependences between any linked process measured values and/or alarms. In addition, the exemplary method comprises sorting the characteristic values and, with reference to the threshold values, rejecting any characteristic value determined to be below a respective threshold value. Furthermore, the exemplary method comprises generating alarm suppression rules on the basis of the characteristic values not rejected, and outputting the generated alarm suppression rules as a proposal.

According to a fourth aspect of the present disclosure, an exemplary method is provided for automatically identifying historical process measured values, which are causally linked to one another and have resulted in alarms, using a data processing device, which has access to historical process measured values and to predefined threshold values for dependences between process measured values. The exemplary method comprises evaluating the historical process measured values for a selected period of time in the past using suitable calculation methods, and determining characteristic values for dependences between the evaluated process measured values. The exemplary method also comprises sorting the characteristic values, and with reference to the threshold values, rejecting any characteristic value determined to be below a respective threshold value. In addition, the exemplary method comprises, for process measured values A and B which are respectively strongly coupled according to the characteristic values not rejected, where a fault on which the process measured value A is based is the cause of a fault on which the process measured value B is based, and the process measured value A not yet having triggered an alarm, using the historical process measured values to verify whether a predictive alarm would have been advantageous, as an earlier warning, for process measured value A, and outputting the result of the verification.

According to a fifth aspect of the present disclosure, an exemplary data processing device is provided. The data processing device comprises a receiving unit configured to be supplied with historical process measured values and alarms, test and assessment criteria for alarm characteristic values, predefined alarm configuration parameters, predefined threshold values for dependences between process measured values and/or alarms, and threshold values for dependences between process measured values. In addition, the exemplary device comprises at least one module configured to evaluate historical process measured values and alarms, determine and assess alarm characteristic values, calculate new alarm configuration parameters, identify process measured values and/or alarms which are causally linked to one another, and determine values for dependences between linked process measured values and/or alarms. Furthermore, the exemplary device comprises an output unit configured to output optimized alarm configuration parameters and/or alarm suppression rules.

BRIEF DESCRIPTION OF DRAWINGS

Further advantages and refinements of the present disclosure are explained in more detail below with reference to exemplary embodiments which are illustrated in the drawings, in which.

DETAILED DESCRIPTION

Exemplary embodiments of the present disclosure provide methods which can be used to optimize alarm systems, and a device which is configured to carry out the exemplary methods.

Exemplary methods as disclosed herein according to various aspects, provide that historical process measured values—and, if appropriate, historical alarms—are evaluated and utilized to generate alarm suppression rules, and in conjunction with predefined requirements, are also used to test, assess and optimize proposed alarm configuration parameters and identify predictive alarms. Advantageous refinements and a device for carrying out the exemplary methods are explained in greater detail below.

According to at least one embodiment, an exemplary measure which can be common to exemplary methods or variants thereof is that of using historical process measured values to optimize an alarm system, that is to say dispensing with data reduction, for example mapping of analog process measured values to binary events, to make possible to use all the information provided by process measured values for analysis purposes. Since there is no restriction to discrete events, redundant alarms can be identified with a greater degree of accuracy. Another advantage is that causes of faults which have hitherto not yet resulted in an alarm can be identified and reported. It is thus possible to alert plant operators sooner. The operators would therefore have more time to react and the process can also be stabilized in a simpler manner in many cases. For a proposed alarm limit value, it is possible to calculate how often this value would have resulted in an alarm being activated in the past. A very small number of activations indicate that the limit value can be set even closer, whereas a large number is against the use of the limit value.

The historical process measured values utilized in carry out the exemplary methods as described herein are generally available as records in process databases or process information management systems.

An exemplary application of at least one method according to the present disclosure is described below.

A heat exchanger cools a container with a very large volume. In this case, the flow rate in the heat exchanger and the temperature in the container are determined. If the limit values for the flow rate in the heat exchanger are set too far apart, the rising container temperature as a heat exchanger slowly becomes blocked and can, in many instances, only be detected at a very late stage.

An exemplary method and device according to the present disclosure make it possible to detect the causal link between the flow rate in the heat exchanger and the temperature in the container, and to set the alarm limits for the flow rate closer together so as to thus detect the looming temperature problem earlier in future as a predictive alarm.

Figure 1:
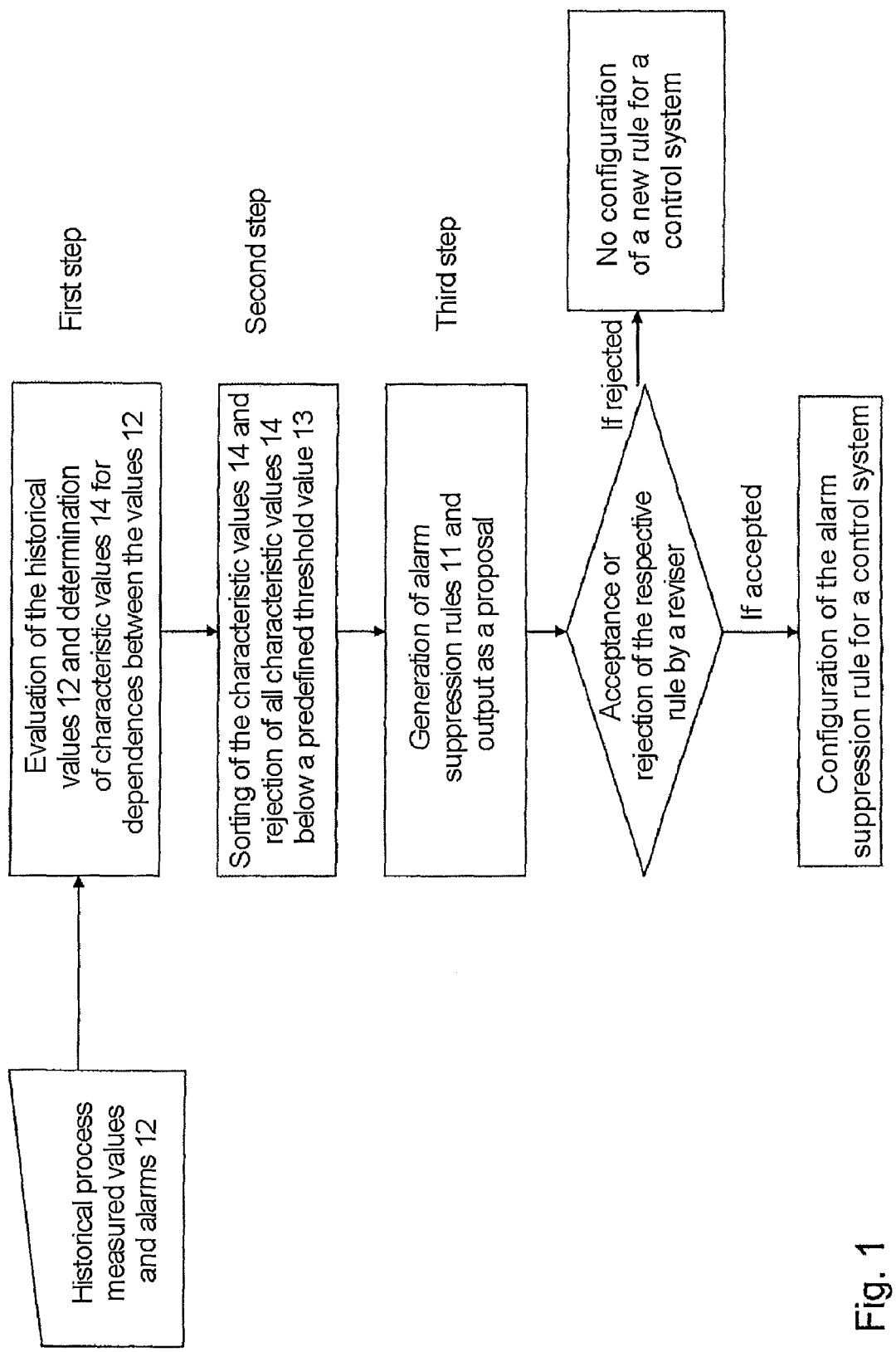
FIG. 1 shows a flowchart of an exemplary method for generating alarm suppression rules.

FIG. 1 shows the sequence of an exemplary automated method for generating alarm suppression rules, historical process measured values and alarms 12 being evaluated and characteristic values 14 for dependences between the values 12 being determined in a first step according to the example of FIG. 1, following the start of the method. Methods such as transfer entropy causality, time delay causality and correlation methods are suitable for this purpose, for example.

In a second step shown in the example of FIG. 1, the characteristic values 14 are sorted and dependences with characteristic values below a predefined threshold value 13 are rejected.

In the third step, alarm suppression rules 11 are generated and displayed as proposals. According to an alternative configuration, such alarm suppression rules 11 can be output in another manner. Such alarm suppression rules 11 can state, for example, that an alarm is not shown if a particular other alarm has already occurred.

The automated portion of the exemplary method illustrated in FIG. 1 ends, with the output of alarm suppression rules 11 as a proposal.

Thereafter, a reviser can accept or reject the proposals. If accepted, the reviser can configure the respective alarm suppression rule(s) in the corresponding control system, thus making it possible to reduce the number of alarms indicated and/or projected to the plant operator. If rejected, the reviser can refrain from configuring the control system to accommodate an alarm suppression rule for the proposal.

Figure 2:
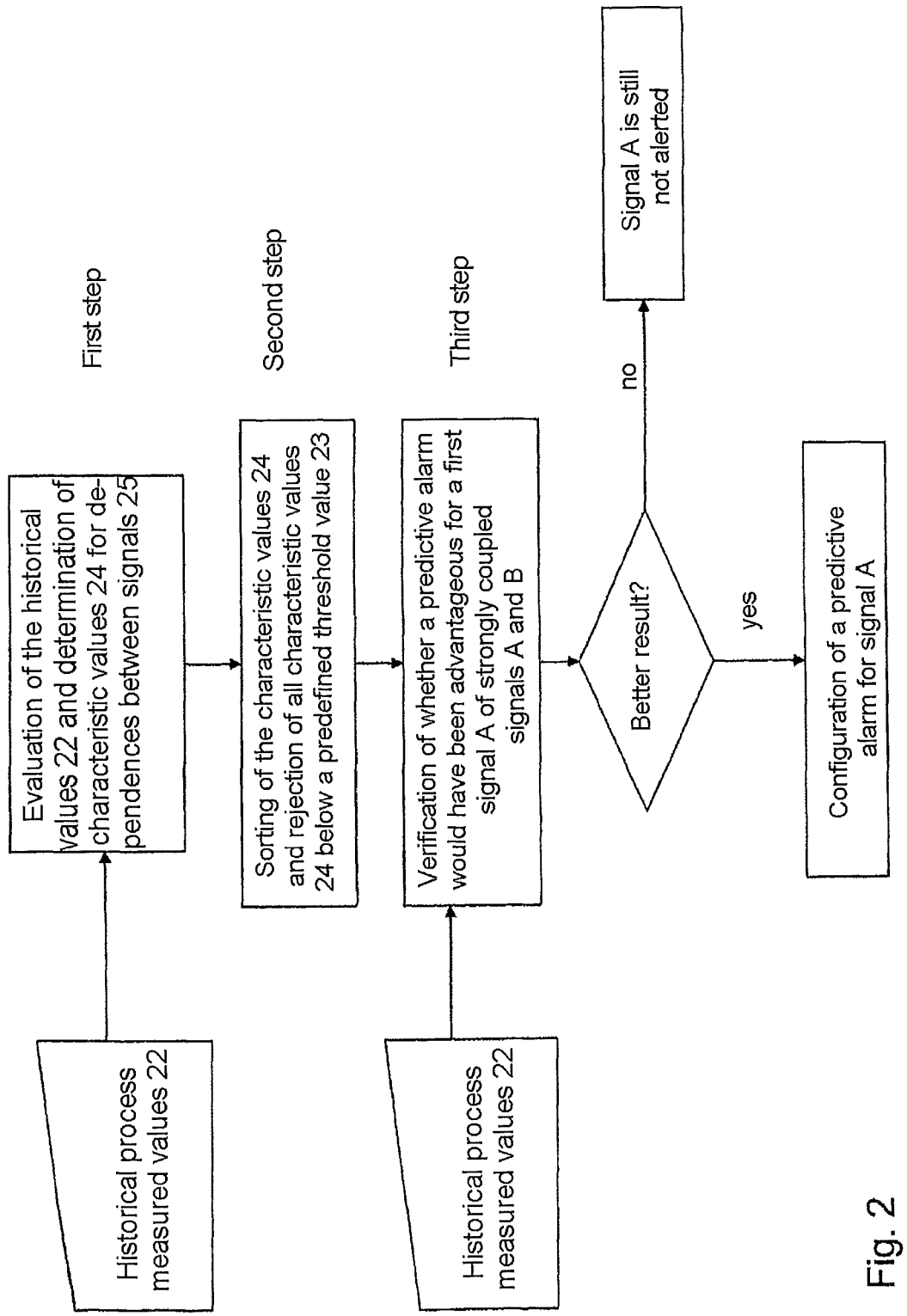
FIG. 2 shows a flowchart of an exemplary method for identifying predictive alarms.

FIG. 2 shows the sequence of an exemplary automated method for determining predictive alarms, in which historical process values 22 can be used both for evaluation and for verification.

In a first step shown in the example of FIG. 2, historical process values 22 (also referred to as process measured values) are evaluated by means of suitable methods, such as correlation, transfer entropy causality, and/or time delay causality, for example, to identify dependences between process measured values 22 and determine characteristic values 24 for such dependences. In a second step shown in the example of FIG. 2, the characteristic values 24 are sorted and those characteristic values 24 which are below a predefined threshold value 23 are eliminated. Strongly coupled process measured values A and B thus remain, where fault in the process measured value A respectively is the cause of a subsequent fault in the process measured value B. The third step in the example of FIG. 2 verifies whether a predictive alarm for process measured value A, in the example where the historical process values 22, are used would have been favorable with regard to the further development of the progression of the fault at that time. If the check shows that earlier alerting would have been better, it is assumed that a predictive alarm for process measured value A will also be advantageous in the future and that such an alarm will be configured in the control system and will be displayed as a predictive alarm for process measured value A. On the other hand, if earlier alerting is determined not to have provided a better result, a predictive alarm for process measured value A can, for example, not be configured in the control system.

Figure 3:
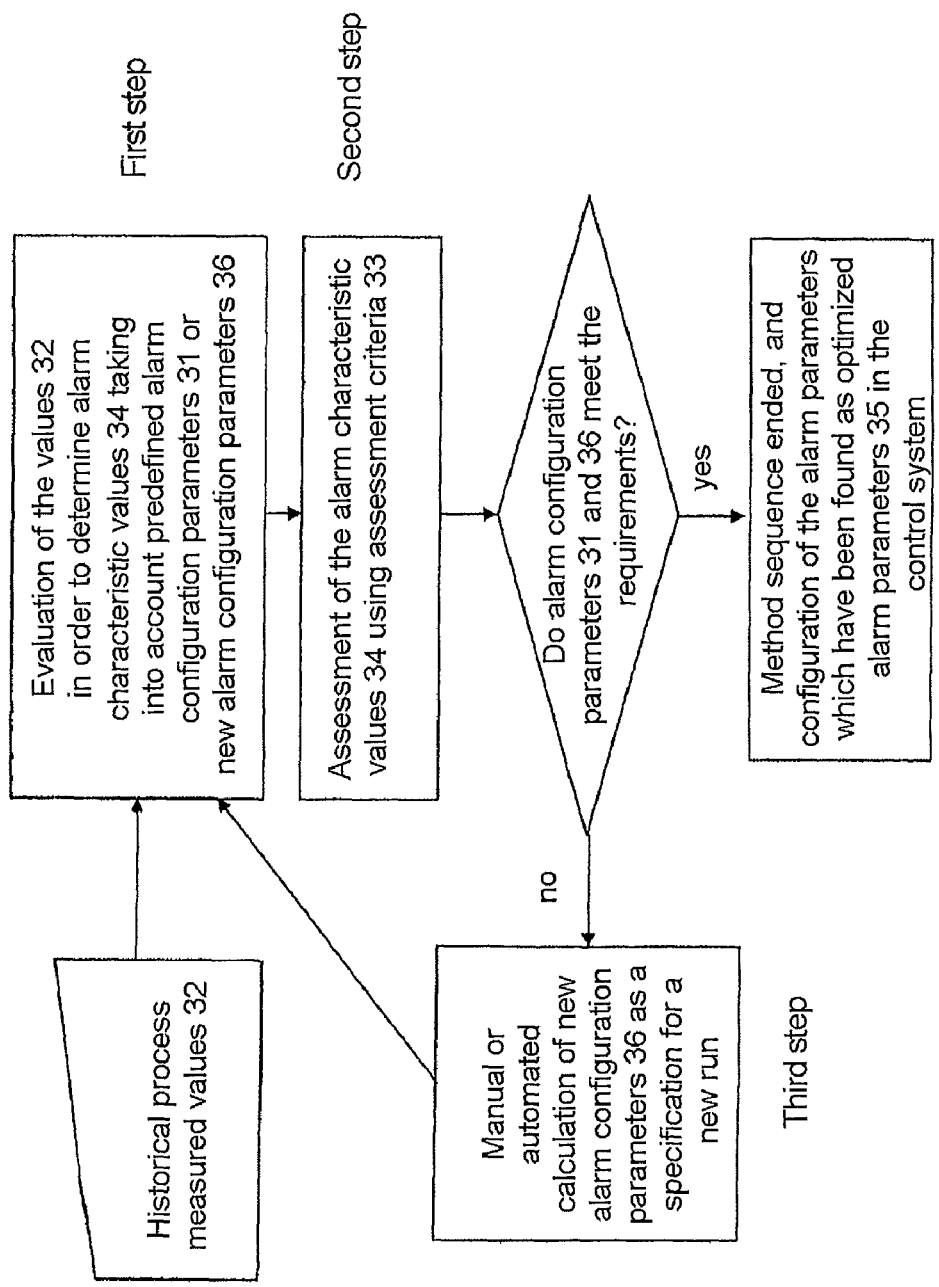
FIG. 3 shows a flowchart of an exemplary method for assessing and, if appropriate, optimizing predefined alarm configuration parameters.

In an exemplary method according to FIG. 3, the suitability of predefined alarm configuration parameters 31 is checked. For this purpose, in a first step according to the example of FIG. 3, historical process values 32 are evaluated for a selected period of time in the past taking into account the respective predefined alarm configuration parameters 31, and alarm characteristic values 34 are calculated. Such alarm characteristic values 34 may be, for example, an alarm rate, an alarm duration, peak values or a false alarm rate. In a second step according to the example of FIG. 4, alarm characteristic values 34 which have been determined are assessed using assessment criteria 33. The assessment criterion 33 may be, for example, a target function, a quality criterion or a cost function. A criterion may be, for example, an alarm rate, an alarm threshold rate, a false alarm rate or else an alarm non-detection rate. A quality criterion may be, for example, as follows: an alarm must be active at times ta, tb, tc. The more exact the alarm is active precisely in the periods of time ta1 to ta2, tb1 to tb2, tc1 to tc2, the better. Each minute of inactivity inside these periods of time can cost ten points, for example. Each minute of activity outside these periods of time can cost five points, for example. The alarm should be activated ten times at most in the selected period of time. If, for example, consideration of such a quality criterion or other criteria reveals that a determined alarm characteristic value 34 meets the requirements, the exemplary method can be finished and the associated alarm parameter can be configured as an optimum alarm parameter 35 in the control system. On the other hand, if the alarm characteristic value 34 does not meet the requirements, the alarm parameter can be changed and specified as a new alarm configuration parameter 36 for a rerun of the method in a manual third step or in a third step which is likewise carried out in an automated fashion similar to the previous steps.

Figure 4:
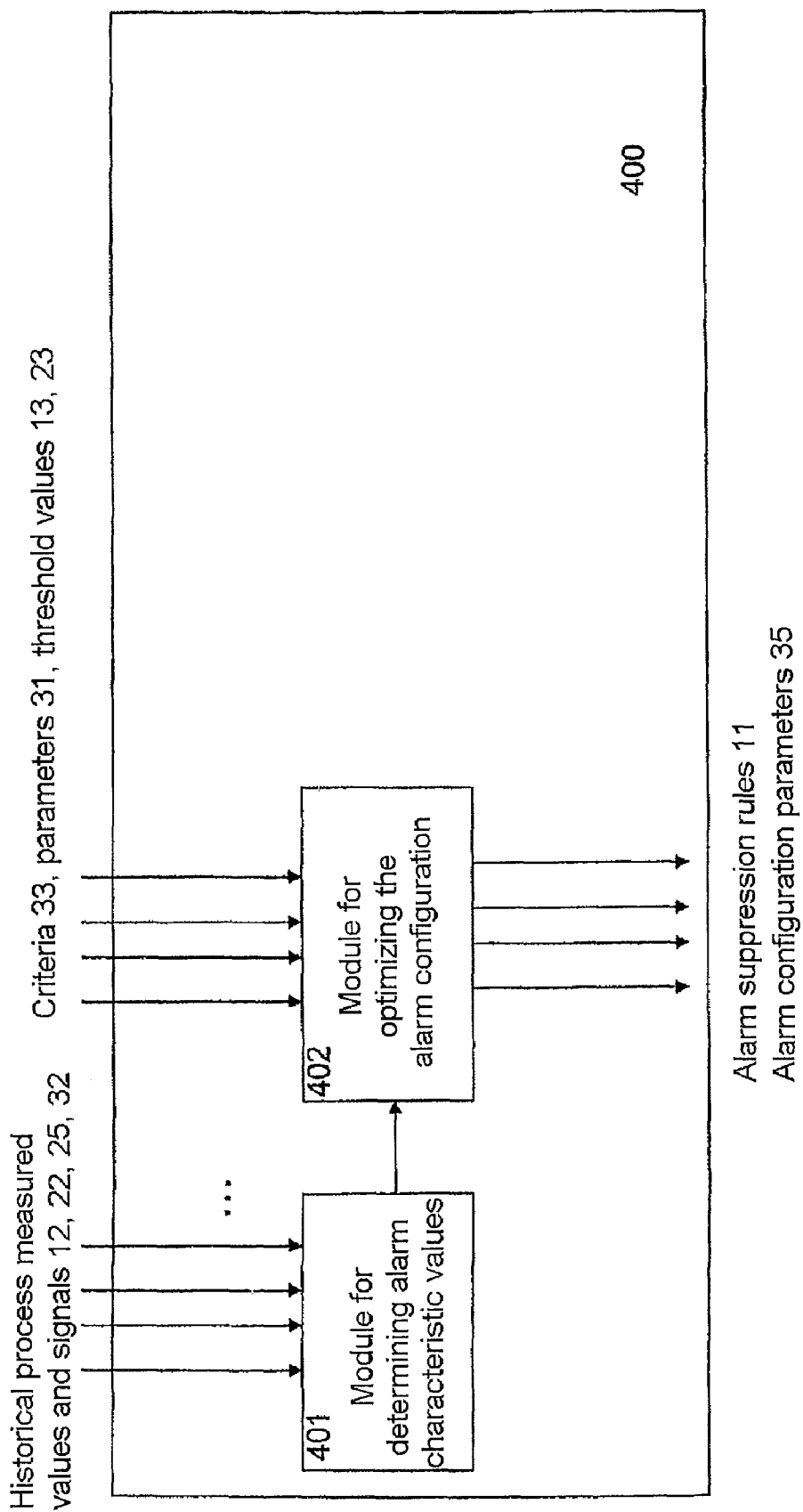
FIG. 4 shows a block diagram of an exemplary device configured to carry out any of the aforementioned methods.

FIG. 4 diagrammatically illustrates an exemplary data processing device 400 containing a module 401 for determining alarm characteristic values and a processing module 402, in particular for optimizing the alarm configuration. The data processing device 400 is structurally configured to evaluate historical process measured values and alarms (12, 22, 32), to take into account predefined criteria (33), characteristic values (14, 24, 34), parameters (31, 36) and threshold values (23) and to output results such as optimized alarm configuration parameters (35) or alarm suppression rules (11). The data processing device 400 has access to any and all data illustrated in the example of FIG. 4. According to one exemplary configuration, the modules 401 and 402 can be hardware circuitry configured to carry out the aforesaid functionality. Alternatively, the modules 401 ad 402 can be implemented as computer program instructions recorded on a computer-readable recording medium (e.g., nonvolatile and/or volatile memory) and causing a general-purpose and/or special purpose computer to, when executing the instructions, perform any of the elements of the exemplary methods as described above.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for automatically optimizing alarm configuration parameters using a data processing device, which has access to predefined alarm configuration parameters, to historical process measured values and to test and assessment criteria for alarm characteristic values, the method comprising:

evaluating the historical process measured values for a selected period of time in the past using calculation methods with reference to the predefined alarm configuration parameters, to determine alarm characteristic values, assessing the determined alarm characteristic values with reference to the test and assessment criteria for alarm characteristic values;

outputting the predefined alarm configuration parameters as optimized alarm configuration parameters if the alarm characteristic values meet requirements according to the test and assessment criteria for alarm characteristic values; and calculating new alarm configuration parameters using optimization algorithms, and carrying out the evaluating, assessing and outputting steps again, if the determined alarm characteristic values do not meet the requirements for alarm characteristic values, the new alarm configuration parameters being used as predefined alarm configuration parameters.

2. A method for automatically generating alarm suppression rules using a data processing device, which has access to historical process measured values and alarms and to predefined threshold values for dependences between at least one of process measured values and alarms, the method comprising:

evaluating the historical process measured values and alarms for a selected period of time in the past using calculation methods;

identifying at least one of process measured values and alarms which are causally linked to one another;

determining characteristic values for dependences between any linked at least one of process measured values and alarms;

sorting the characteristic values and, with reference to the threshold values, rejecting any characteristic value determined to be below a respective threshold value; and generating alarm suppression rules on the basis of the characteristic values not rejected, and outputting the generated alarm suppression rules as a proposal.

3. A method for automatically identifying historical process measured values, which are causally linked to one another and have resulted in alarms, using a data processing device, which has access to historical process measured values and to predefined threshold values for dependences between process measured values, the method comprising:

evaluating the historical process measured values for a selected period of time in the past using calculation methods, and determining characteristic values for dependences between the evaluated process measured values;

sorting the characteristic values, and with reference to the threshold values, rejecting any characteristic value determined to be below a respective threshold value;

for process measured values A and B which are respectively coupled according to the characteristic values not rejected, where a fault on which the process measured value A is based is the cause of a fault on which the process measured value B is based, and the process measured value A not yet having triggered an alarm, using the historical process measured values to verify whether a predictive alarm is usable, as an earlier warning, for process measured value A, and outputting the result of the verification.

4. The method as claimed in claim 1, wherein the calculation methods includes at least one of entropy causality, time delay causality and correlation methods.

5. The method as claimed in claim 2, wherein the calculation methods include at least one of entropy causality, time delay causality and correlation methods.

6. The method as claimed in claim 3, wherein the calculation methods include at least one of entropy causality, time delay causality and correlation methods.

7. The method as claimed in claim 1, wherein the test and assessment criteria for alarm characteristic values include at least one of an alarm threshold rate, a false alarm rate, an alarm non-detection rate, a target function, a cost function, and another quality criterion.

8. The method as claimed in claim 1, wherein the alarm characteristic values include at least one of an alarm rate, an alarm duration, a false alarm rate, and peak values.

9. A data processing device comprising:

a receiving unit configured to receive predefined alarm configuration parameters, historical process measured values, and test and assessment criteria for alarm characteristic values;

at least one module configured to evaluate the historical process measured values for a selected period of time in the past using calculation methods with reference to the predefined alarm configuration parameters, determine alarm characteristic values, assess the determined alarm characteristic values with reference to the test and assessment criteria for alarm characteristic values, and calculate new alarm configurations using optimization algorithms; and an output unit configured to output the predefined alarm configuration parameters as optimized alarm configuration parameters if the alarm characteristic values meet requirements according to the test and assessment criteria for alarm characteristic values, wherein the at least one module is configured to re-evaluate the historical process measured values, re-assess the determined alarm characteristic values, and cause the control unit to re-output the predefined alarm configuration parameters if the determined alarm characteristic values do not meet the requirements for alarm characteristic values, the new alarm configuration parameters being used as predefined alarm configuration parameters.

10. A data processing device comprising:

a receiving unit configured to be supplied with historical process measured values and alarms, and predefined threshold values for dependences between at least one of process measured values and alarms;

at least one module configured to evaluate the historical process measured values and alarms for a selected period of time in the past using calculation methods, identify at least one of process measured values and alarms which are causally linked to one another, determine characteristic values for dependences between any linked at least one of process measured values and alarms, sort the characteristic values, reject any characteristic value determined to be below a respective threshold value, with reference to the threshold values, and to generate alarm suppression rules on the basis of the characteristic values not rejected; and an output unit configured to output the generated alarm suppression rules as a proposal.

11. A data processing device comprising:

a receiving unit configured to be supplied with historical process measured values and predefined threshold values for dependences between process measured values;

at least one module configured to evaluate the historical process measured values for a selected period of time in the past using calculation methods, determine characteristic values for dependences between the evaluated process measured values, sort the characteristic values, reject any characteristic value determined to be below a respective threshold value, with reference to the threshold values, and for process measured values A and B which are respectively coupled according to the characteristic values not rejected, where a fault on which the process measured value A is based is the cause of a fault on which the process measured value B is based, and the process measured value A not yet having triggered an alarm, use the historical process measured values to verify whether a predictive alarm is usable, as an earlier warning, for process measured value A; and an output unit configured to output the result of the verification.

* * * * *